(12) United States Patent
Bradley et al.

(10) Patent No.: US 11,246,379 B2
(45) Date of Patent: *Feb. 15, 2022

(54) ADJUSTABLE CONNECTORS FOR USE WITH WEBBING OF PATIENT HARNESS SYSTEMS AND OTHER TYPES OF SAFETY BELT SYSTEMS

(71) Applicant: Intertek Industrial Corporation, Jacksonville, FL (US)

(72) Inventors: Scott Bradley, Jacksonville, FL (US); Leonard Shllaku, Jacksonville, FL (US)

(73) Assignee: Intertek Industrial Corporation, Jacksonville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/910,602

(22) Filed: Jun. 24, 2020

(65) Prior Publication Data

US 2021/0000224 A1    Jan. 7, 2021

Related U.S. Application Data

(63) Continuation-in-part of application No. 16/460,616, filed on Jul. 2, 2019, now Pat. No. 10,897,964.

(51) Int. Cl.
*A44B 11/08* (2006.01)
*A44B 11/10* (2006.01)
(Continued)

(52) U.S. Cl.
CPC .......... *A44B 11/2553* (2013.01); *A44B 11/06* (2013.01); *A44B 11/2561* (2013.01);
(Continued)

(58) Field of Classification Search
CPC ............. Y10T 24/4019; Y10T 24/4736; Y10T 24/4084
See application file for complete search history.

(56) References Cited

U.S. PATENT DOCUMENTS 2,995,400 A    6/1884    Herkimer
1,722,140 A    7/1929    Gans
(Continued)

FOREIGN PATENT DOCUMENTS

WO    WO2012/154504 A2    11/2012

OTHER PUBLICATIONS

Response to European Search Report dated May 25, 2021, EP Application No. 20183780.4-1017.
(Continued)

*Primary Examiner* — Robert Sandy
*Assistant Examiner* — Michael S Lee
(74) *Attorney, Agent, or Firm* — Vierra Magen Marcus LLP (57) ABSTRACT

Adjustable connectors disclosed herein are adapted to connect webbing to a buckle. The webbing can be, e.g., a urethane coated webbing, some other type of coated webbing, or a non-coated webbing. The adjustable connector includes a baseplate, a tongue at a front end of the baseplate, a webbing aperture within the baseplate, first and second walls extending perpendicularly from the baseplate, and first and second slots respectively within the first and second walls. In certain embodiments, the slots are tapered. In certain embodiments, the adjustable connector includes a rotatable lock bar including a central portion having an outer surface and first and second tabs. In certain embodiments, each of the tabs has a cross-section with a major-axis that is greater than a minor-axis that is orthogonal to the major-axis. In certain embodiments, a front edge of the webbing aperture comprises an arced front edge.

20 Claims, 4 Drawing Sheets

(51) Int. Cl.
*A44B 11/25* (2006.01)
*A44B 11/06* (2006.01)
*B60R 22/20* (2006.01)
*A61G 3/08* (2006.01)
*B60R 22/18* (2006.01)

(52) U.S. Cl.
CPC ............ *B60R 22/20* (2013.01); *A61G 3/0808* (2013.01); *A61G 3/0816* (2013.01); *B60R 2022/1806* (2013.01); *B60R 2022/1812* (2013.01); *Y10T 24/4019* (2015.01); *Y10T 24/4084* (2015.01); *Y10T 24/4736* (2015.01)

(56) References Cited

U.S. PATENT DOCUMENTS

| | | | |
|---|---|---|---|
| 2,919,481 | A | 1/1960 | Finken et al. |
| 3,274,656 | A | 9/1966 | Hamann |
| 3,526,432 | A | 9/1970 | Jensen et al. |
| 3,606,439 | A | 9/1971 | Rutan |
| 3,974,546 | A | 8/1976 | Walker |
| 4,101,171 | A | 7/1978 | Sasaki et al. |
| 4,386,452 | A | 6/1983 | Stephenson |
| 4,444,432 | A | 4/1984 | Kikuchi |
| 4,551,889 | A | 11/1985 | Narayan et al. |
| 4,608,735 | A | 9/1986 | Kasai |
| 4,893,874 | A | 1/1990 | Childress et al. |
| 5,311,653 | A | 5/1994 | Merrick |
| D348,420 | S | 7/1994 | Edsall |
| 5,899,499 | A | 5/1999 | Ito |
| D647,819 | S | 11/2011 | Kolasa |
| 8,322,000 | B2 | 12/2012 | Dziengowski et al. |
| 8,935,833 | B2 | 1/2015 | Kaneko |
| 8,944,468 | B2 | 2/2015 | Cox et al. |
| 9,090,225 | B2 | 7/2015 | Rouhana |
| 10,080,693 | B1 | 9/2018 | Scheenstra et al. |
| 10,080,694 | B1 | 9/2018 | Scheenstra et al. |
| 2006/0218761 | A1 | 10/2006 | Anscher |
| 2009/0288275 | A1 | 11/2009 | Wendt et al. |
| 2016/0000190 | A1 | 1/2016 | Knoedl |
| 2018/0078003 | A1 | 3/2018 | Anderlini |
| 2019/0263349 | A1 | 8/2019 | Ruthinowski |

OTHER PUBLICATIONS

Notice of Allowance dated Oct. 16, 2020, U.S. Appl. No. 16/460,616, filed Jul. 2, 2019.
Extended European Search Report dated Nov. 9, 2020, EP Application No. 20183780.4-1017.
Non-final Office Action dated Jul. 14, 2020, U.S. Appl. No. 16/460,616, filed Jul. 2, 2019.
Response to Office Action dated Aug. 27, 2020, U.S. Appl. No. 16/460,616, filed Jul. 2, 2019.
US 4,470,700, 02/1891, Henry (withdrawn).
U.S. Appl. No. 16/460,616, filed Jul. 2, 2019.

ADJUSTABLE CONNECTORS FOR USE WITH WEBBING OF PATIENT HARNESS SYSTEMS AND OTHER TYPES OF SAFETY BELT SYSTEMS

PRIORITY CLAIM

This application is a continuation-in-part (CIP) of and claims priority to U.S. patent application Ser. No. 16/460,616, filed Jul. 2, 2019, published as U.S. 2021/0000225 on Jan. 7, 2021 and issued as U.S. Pat. No. 10,897,964 on Jan. 26, 2021 which is incorporated herein by reference in its entirety.

FIELD OF TECHNOLOGY

Embodiments of the present technology generally relate to adjustable connectors for use with patient harness systems and other types of safety belt systems.

BACKGROUND

Patient transport apparatuses are used to transport patients in ambulances, other types of vehicles, hospitals, and other types of facilities. Various types of patient transport apparatuses exist, such as, but not limited to, stretchers, cots, wheelchairs, hospital beds, and/or the like. When used to transport patients, e.g., in an ambulance or hospital, it is important to keep the patients securely restrained for their safety and the safety of the medical personnel transporting the patients. Accordingly, harness systems are often used to restrain patients to patient transport apparatuses. Harness systems may also be used to restrain medical personnel to their seats within ambulances and other emergency vehicles. Such harness systems should preferably be easily adjustable so that they readily accommodate use with patients and medical personnel of different sizes, e.g., different heights, weights and girths. Adjustable connectors, which include a metal or alloy tongue (adapted to be received and locked in a buckle) and a metal or alloy lock bar (adapted to lock the connector in place) are typically used to allow for such adjustability. Additionally, such harness systems should be sufficiently strong and lockable to withstand certain crash events. More specifically, they may also need to meet applicable safety standards, such as, but not limited to, crash safety standards if used in vehicles. Further, since such harness systems may be used with patients that are ill, bleeding, vomiting, and/or leaking other bodily fluids, such harness systems are preferably easily cleanable.

Conventional harness systems have used nylon or polyester webbing to strap patients to patient transport apparatuses. However, such webbing if typically porous and thus difficult to clean once subjected to bodily fluids, dirt, grease, and/or other contaminants.

Recently, coated webbings have been manufactured and sold that are liquid resistant and easy to clean. An example of such a coated webbing is the PathoShield™ urethane coated webbing available from Masson Inc., headquartered in Indianapolis, Ind.

A problem with using urethane coated webbing in harness systems is that such webbing is much stiffer than conventional webbing and has a much greater coefficient of friction than conventional webbing, making urethane coated webbing much more difficult to use with adjustable connectors that are made of metal or alloy. More specifically, tests have shown that it is very difficult to adjust the location of an adjustable connector (made of metal or alloy) along a length of urethane coated webbing. Accordingly, while urethane coated webbing has been available for quite some time, many manufacturers of patient transport apparatuses and/or harness systems have not yet incorporated urethane coated webbing into their products. Accordingly, quite a bit of time and other resources are still typically required to clean the webbing that is used in harness systems of patient transport apparatuses.

SUMMARY

Certain embodiments of present technology are directed to an adjustable connector adapted to connect webbing (e.g., a urethane coated webbing) to a buckle. The adjustable connector includes a baseplate, a tongue, a webbing aperture, and a rotatable lock bar. The baseplate is generally planar and includes a front end, a back end, and a central portion between the front and back ends. The tongue, which is at the front end of the baseplate, is adapted to be received and locked in a buckle. The webbing aperture, which is within the central portion of the baseplate, includes a front edge, a back edge, and first and second side edges. Further, first and second walls extend perpendicularly from the baseplate, with first and second slots respectively within the first and second walls. In certain embodiments, the first and second slots each slope downwards towards the back end of the baseplate.

In accordance with certain embodiments, the rotatable lock bar includes a central portion having an outer surface that is preferably textured (e.g., knurled). First and second tabs extend from opposing longitudinal ends of the central portion. The first and second tabs rest respectively within the first and second slots. In certain embodiments, the first and second tabs are slidable along a length of the first and second slots and rotatable within at least a majority of the length of the first and second slots, to thereby enable the rotatable lock bar to be slidable along the length of the first and second slots and rotatable in both clockwise and counterclockwise directions within at least the majority of the length of the first and second slots.

In accordance with certain embodiments, the adjustable connector is adapted for use with a coated webbing having a length thereof that is received within the webbing aperture and loops around at least 180 degrees of the outer surface of the rotatable lock bar. The coated webbing can, e.g., a urethane coated webbing, or some other type of liquid resistant and easily cleanable coated webbing. The rotatable lock bar is adapted to lock the adjustable connector in place relative to the coated webbing, in response to a force being applied to the webbing in a direction that is generally opposite the tongue and generally parallel to the baseplate such that a portion of the webbing adjacent to the back edge of the webbing aperture is forced against the back edge of the webbing aperture. Additionally, the rotatable lock bar is adapted to rotate and allow the adjustable connector to be moved relative to the coated webbing, in response to a force being applied to the webbing in a direction that is generally perpendicular to the baseplate such that the portion of the webbing adjacent to the back edge of the webbing aperture is not forced against the back edge of the webbing aperture.

In accordance with certain embodiments, the front edge of the webbing aperture comprises an arced front edge that extends between the first and second side edges of the webbing aperture such that a distance between a center of the arced front edge of the webbing aperture and the back edge of the webbing aperture is greater than a respective distance between each of the ends of the arced front edge and the back edge of the webbing aperture. The arced front edge of the webbing aperture provides for increased adjustability of the adjustable connector relative to the coated webbing, in response to a force being applied to the webbing in a direction that is generally perpendicular to the baseplate such that the portion of the webbing adjacent to the back edge of the webbing aperture is not forced against the back edge of the webbing aperture, compared to if the front edge of the webbing aperture was a straight edge extending perpendicularly between the first and second side edges of the webbing aperture.

In accordance with certain embodiments, the front edge of the webbing aperture comprises an arced front edge that extends between the first and second side edges of the webbing aperture such that a distance between a center of the arced front edge of the webbing aperture and the back edge of the webbing aperture is greater than a respective distance between each of the ends of the arced front edge and the back edge of the webbing aperture. In certain embodiments, the distance between the center of the arced front edge of the webbing aperture and the back edge of the webbing aperture is at least 50% greater than the respective distance between each of the ends of the arced front edge and the back edge of the webbing aperture.

In accordance with certain embodiments, the arced front edge of the webbing aperture includes an intermediate arced portion that extends between first and second distal arced portions, wherein the intermediate arced portion of the arced front edge of the webbing aperture has an arc radius that is greater than a respective arc radius of each of the first and second distal arced portions of the arced front edge of the webbing aperture. More specifically, in certain embodiments, the arc radius of the intermediate arced portion of the arced front edge of the webbing aperture is at least three times greater than the respective arc radius of each of the first and second distal arced portions of the arced front edge of the webbing aperture.

Where the front edge of the webbing aperture is an arced front edge, the arced front edge of the webbing aperture provides for increased adjustability of the adjustable connector relative to the coated webbing, in response to a force being applied to the webbing in a direction that is generally perpendicular to the baseplate such that the portion of the webbing adjacent to the back edge of the webbing aperture is not forced against the back edge of the webbing aperture, compared to if the front edge of the webbing aperture was a straight edge extending perpendicularly between the first and second side edges of the webbing aperture.

In accordance with certain embodiments, the arced front edge of the webbing aperture is devoid of any linear segments. In accordance with other embodiments, the arced front edge of the webbing aperture comprises a piecewise linear curve including at least one linear segment.

In accordance with certain embodiments, each of the first and second slots comprises a tapered slot having front end and a back end, with a width of the front end of the tapered slot being greater than a width of the back end of the tapered slot. Each of the first and second tabs has a cross-section including a major-axis that is larger than a minor-axis that is orthogonal to the major-axis. The major-axis of the cross-section of each of the first and second tabs is smaller than the width of each of the first and second slots at the front ends of the first and second slots. The major-axis of the cross-section of each of the first and second tabs is larger than the width of each of the first and second slots at the back ends of the first and second slots.

In accordance with certain embodiments, the rotatable lock bar is slidable along and fully rotatable within the first and second tapered slots from the front ends of the first and second tapered slots to at least halfway toward the back ends of the first and second tapered slots. The rotatable lock bar is no longer fully rotatable within the first and second tapered slots when the first and second tabs of the rotatable lock bar are proximate the back ends of the first and second tapered slots, due to the major-axis of each of the first and second tabs being larger than the width of each of the first and second slots at the back ends of the first and second slots. In accordance with certain embodiments, the cross-section of each of the first and second tabs is oval.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
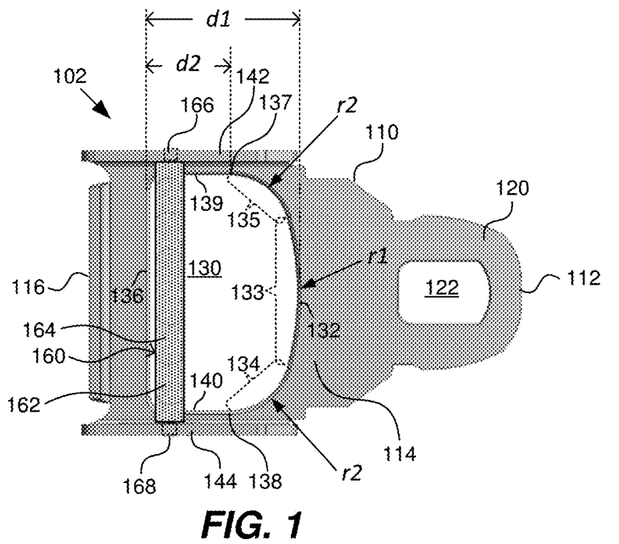
FIG. 1 is a top view of an adjustable connector according to an embodiment of the present technology.
Figure 2:
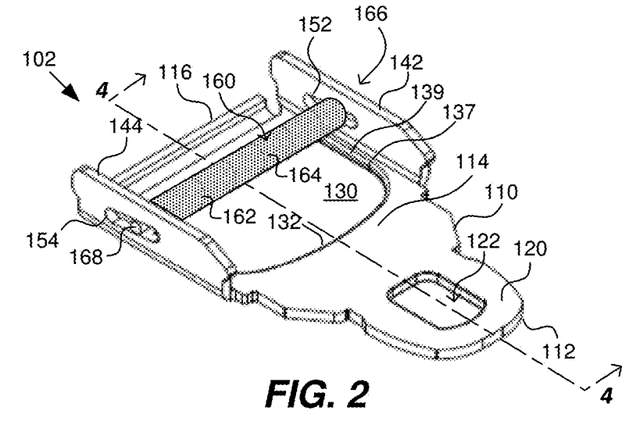
FIG. 2 is a perspective view of the adjustable connector shown in FIG. 1.
Figure 3:
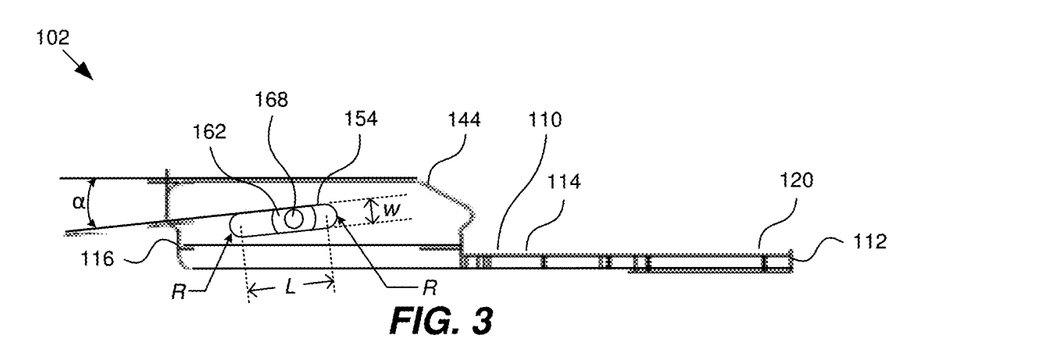
FIG. 3 is a side view of the adjustable connector shown in FIGS. 1 and 2.

Certain embodiments of the present technology are directed to adjustable connectors adapted to connect a urethane coated webbing (or some other type of easily cleanable coated webbing) to a buckle. The adjustable connectors described herein can alternatively be used to connect a non-coated webbing to a buckle. FIG. 1 is a top view of an adjustable connector 102 according to an embodiment of the present technology. FIGS. 2 and 3 are, respectively, perspective and side views of the adjustable connector 102.

Referring to FIGS. 1-3, the adjustable connector 102 is shown as including a baseplate 110, which is generally planar and includes a front end 112 and back end 116, and a central portion 114 between the front and back ends 112, 116. A tongue 120 is located at the front end of the baseplate 110. The tongue 120 includes a tongue aperture 122 and is adapted to be received and locked in a buckle (not shown).

As shown in FIGS. 1-3, the adjustable connector 102 includes a webbing aperture 130 within the central portion 114 of the baseplate 110. The webbing aperture 130 has a front edge 132, a back edge 136, and side edges 139, 140, which collectively define a boundary of the webbing aperture 130.

A pair of walls 142, 144 extend perpendicularly upward from the baseplate 110 at opposing sides of the baseplate 110. More specifically, the wall 142 extends from the baseplate 110 in close proximity to the side edge 139 of the webbing aperture 130, and the wall 144 extends from the baseplate 110 in close proximity to the side edge 140 of the webbing aperture 130. As shown in FIGS. 2-3, slots 152, 154 are included respectively within the walls 142, 144. As shown in FIG. 3, each of the slots 152, 154 is shown as slanting downward towards the back end 116 of the baseplate 110 at an angle α, which can be referred to as the slot slant angle. In certain embodiments the slot slant angle α is within the range of 4 degrees to 15 degrees, and in a specific embodiment is 6 degrees. In alternative embodiments, rather than sloping downwards, the slots 152, 154 can be generally parallel to the baseplate 110. In FIG. 3, the slot 154 is shown as having a length L and a width w, which are the same respectively as the length and width of the other slot 152. In the embodiment shown in FIG. 1-3, the slots 152, 154 are linear along their entire lengths L, and a radius R at a back end of each of the slots 152, 154 (the end closest to the back end 116 of the baseplate 110) is the same as a radius R at a front end of the slots 152, 154 (the end closest to the front edge 132 of the webbing aperture 130). In certain embodiments, the radius R is in the range of 1.5 millimeters (mm) to 2.5 mm, and in a specific embodiment is 1.75 mm. In certain embodiments, the length L of the slots 152, 154 (from the center-to-center of the two circles corresponding to the two radiuses R) is within the range of 7.5 mm to 15 mm, and in a specific embodiment is 10 mm. In certain alternative embodiments, the slots 152, 154 are not linear along their entire lengths L, but rather, the lengths of the slots 152, 154 can be partially or continuously curved, or can be made up of multiple contiguous linear segments each having a different slant angle, or made up of a combination of one or more linear segments and one or more curved segments. In a specific alternative embodiment, described below with reference to FIGS. 6-8, each of the slots is tapered, such that the slots are narrower in width at the back ends of the slots (closest to the back end 116 of the baseplate 110) than at the front ends of the slots (closest to the front edge 132 of the webbing aperture 130). Where the lengths L of the two slots 152, 154 are the same, such lengths can also be referred to singularly as a length (or the length) of the slots.

Still referring to FIGS. 1-3, the tongue 120 and the walls 142, 144 are integrally formed with the baseplate 110. In certain embodiments, the baseplate 110, the tongue 120, and the walls 142, 144 are made from a blank of cold rolled carbon steel that is chrome nickel plated and bent to provide the walls 142, 144. Such a blank could already include the apertures 122 and 130, and the slots 152 and 154 before portions of the blank are bent to provide the walls 142, 144. Metalworking machines that can be used to bend such a blank are often referred to as brakes, bending machines, bending breaks, sheet metal folders, or folders. The use of alternative types of metals or alloys and coatings are also within the scope of the embodiments described herein.

The adjustable connector 102 also includes a rotatable lock bar 160 that is configured to span a gap between the walls 142, 144. The rotatable lock bar 160 include a central portion 162 having an outer surface 164. The outer surface 164 is preferably textured (e.g., knurled) to increase the coefficient of friction of the outer surface 164 compared to if it were smooth, so that the outer surface 164 will readily grip a length of webbing. Tabs 166, 168 extend from opposing longitudinal ends of the central portion 162 and have smaller diameters (or more generally, cross-sectional widths) than the central portion 162. The diameters (or more generally, cross-sectional widths) of the tabs 166, 168 are slightly smaller than widths of the slots 152, 154, thereby enabling the tabs 166, 168 to rest within, be slidable along, and be rotatable within, the entire lengths of the slots 152, 154. For an example, the width of the each of the slots 152, 154 can be 3.5 mm, and the diameter of each of the tabs 166, 168 can be 3.0 mm. This in turn enables the rotatable lock bar 160 to be slidable along the lengths of the slots 152, 154 and rotatable in both clockwise and counterclockwise directions. In certain embodiments the rotatable lock bar 160 is made from heat treated carbon steel that is zinc plated. The use of other types of metals or alloys and/or coatings for the rotatable lock bar 160 are also within the scope of the embodiments described herein.

Figure 4:
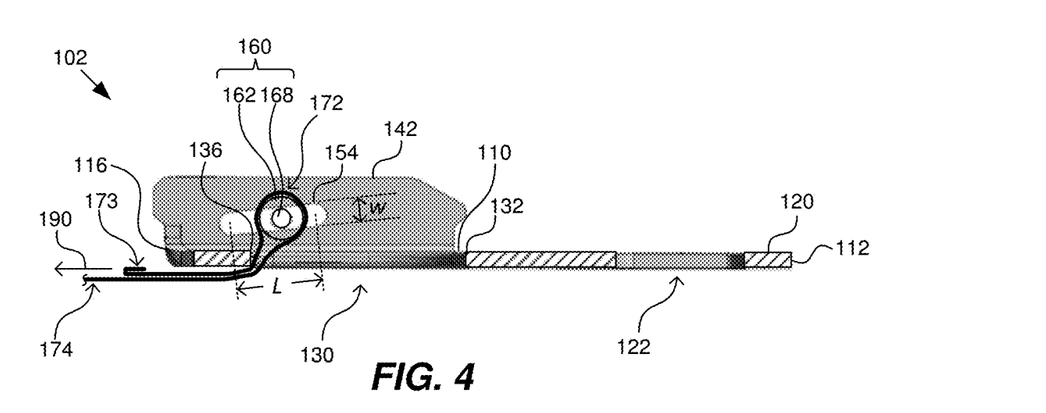
FIG. 4 is a cross-sectional view of the adjustable connector shown in FIGS. 1-3 taken along the line 4-4 in FIG. 2, viewed in the direction of the arrows, and showing a loop of webbing extending around a rotatable lock bar of the adjustable connector.

FIG. 4 is a cross-sectional view of the adjustable connector 102 taken along the line 4-4 in FIG. 2, viewed in the direction of the arrows, and showing a loop of webbing 172 extending around the rotatable lock bar 160 of the adjustable connector 102. The loop of webbing 172 includes an upper free end segment 173 and a lower connected end segment 174 that is connected to something sturdy, such as a frame of a stretcher, cot, wheelchair, seat, or vehicle, but not limited thereto. A portion of the free end segment 173 of the loop of webbing 172 comes into contact with the back edge 136 of the webbing aperture 130 when a force is applied to the free end segment 173 in the direction of the arrow 190 shown in FIG. 4, as explained in further detail below.

In accordance with certain embodiments, the webbing 172 is a fabric material coated or encapsulated by a plastic, such as urethane, in which case the webbing 172 can be referred to as a coated webbing 172, or even more specifically (if coated by urethane) as a urethane coated webbing 172. Such a urethane coated webbing can be coated, e.g., with thermoplastic polyurethane (TPU) that is specifically designed to be resistant to oil, grease and abrasion. An exemplary urethane coated webbing is the PathoShield™ webbing available from Masson Inc., headquartered in Indianapolis, Ind. The coated webbing 172 will grip the outer surface 164 (of the central portion 162 of the rotatable lock bar 160) when the webbing 172 comes in contact therewith. As noted above, urethane coated webbing is stiffer and has a higher coefficient of friction compared to conventional non-coated webbing. This makes it very difficult to adjust the location of a conventional adjustable connector (which includes a non-rotatable lock bar) along a urethane coated webbing, as will be described in additional detail below. Instead of being a urethane coated webbing, the webbing 172 can be some other type of coated webbing that is resistant to oil, grease (and liquids in general), and is thereby easily cleanable. Such a coated webbing is also preferably resistant to abrasion. The webbing 172 can alternatively be a non-coated more conventional type of webbing.

In the embodiment shown in FIGS. 1-4, the central portion 162 of the rotatable lock bar 160 is cylindrical and has a circular cross-section. Similarly, in the embodiment shown in FIGS. 1-4, the tabs 166, 168 of the rotatable lock bar 160 are also cylindrical and have a circular cross-section. In alternative embodiments, the central portion 162 of the rotatable lock bar 160 need not be cylindrical and need not have a circular cross-section. For example, the central portion 162 of the rotatable lock bar 160 can alternatively be cuboidal or rectangular and have a square or rectangular cross-section. For another example, the cross-section of the central portion 162 of the rotatable lock bar 160 can have various other shapes, such as, but not limited to, pentagonal, hexagonal, or octagonal. Further, the tabs 166, 168 of the rotatable lock bar 160 need not be cylindrical and need not have a circular cross-section, so long as the tabs 166, 168 are slidable along and rotatable within an entire lengths of the slots 152, 154, to thereby enable the rotatable lock bar 160 to be slidable along and rotatable in both clockwise and counter-clockwise directions along the entire lengths of the slots 152, 154. For example, the cross-sections of the tabs 166, 168 of the rotatable lock bar 160 can have various other shapes, such as, but not limited to, pentagonal, hexagonal, or octagonal. In other embodiments, described below with reference to FIGS. 6-8, the tabs are oval, which provides certain advantages explained below with reference to FIGS. 6-8.

Referring to FIG. 4, in certain embodiments, an end of the segment 174 of the webbing is secured to something sturdy, as noted above. In order to connect the adjustable connector 102 to the webbing 172, a most distal end of the free end segment 173 of the webbing 172 is extended beneath the baseplate 110 and upwardly through the webbing aperture 130 in a counterclockwise direction (as viewed in FIG. 4) and at least partially around the rotatable lock bar 160 passing back through the webbing aperture 130 near the back edge 136. In other words, to connect the adjustable connector 102 to the webbing 172, a length of the webbing 172 is looped around the central portion 162 of the rotatable lock bar 160. While the free end segment 173 of the webbing 172 is positioned over a main body of the webbing 172, a user can grasp and pull the free end segment 173 into the direction of arrow 190 to tighten the adjustable connector 102.

In operation, the tongue 120 is lockingly engageable with a buckle (not shown) that is secured directly or via another length of webbing to a vehicle, bed, chair, cot, stretcher frame, or the like. A user grasps the free end segment 173 of the webbing 172 and pulls it in the direction of the arrow 190. In the event slack exists in the webbing 172 the rotatable lock bar 160 rotates in a counterclockwise direction as viewed in FIG. 4. As the webbing 172 is further tightened, the webbing 172 is gripped by the outer surface 164 of the central portion 162 of the rotatable lock bar 160 which will cause the rotatable lock bar 160 to move (e.g., downwardly) in slots 152, 154 causing the webbing to serpentine around the back edge 136 of the webbing aperture 130 thereby positioning a portion of the webbing 172 adjacent to and against the back edge 136, and thereby locking the webbing 172 to the adjustable connector 102, and vice versa.

The rotatable lock bar 160 is able to rotate as the adjustable connector 102 is moved to-and-fro relative to the webbing 172. The rotatability of the rotatable lock bar 160 provides a mechanism by which a location of the adjustable connector 102 can be adjusted relative to the length of the webbing 172 when the webbing 172 is slack and positioned apart from the back edge 136 of the webbing aperture 130. Additionally, by being slidable along the lengths of the slots 152, 154, the rotatable lock bar 160 allows contact between the webbing 172 and the rotatable lock bar 160 to limit relative motion between the webbing 172 and the rotatable lock bar 160 as the rotatable lock bar 160 moves (e.g., downwardly) in the slots 152, 156 and forces a portion of the webbing 172 against the back edge 136 of the webbing aperture.

The back edge 136 of the webbing aperture 130 provides a stop surface which extends perpendicularly to and between the upstanding walls 142, 144. The back edge 136 of the webbing aperture 130 engages a portion of the webbing 172 when the webbing 172 is taut and extending in the direction of arrow 190 which is parallel and in an opposite direction to the direction that the tongue 120 extends from baseplate 110. By positioning the webbing 172 generally perpendicular to baseplate 110, the portion of the webbing 172 that had been forced against the back edge 136 is moved apart from the back edge 136 thereby unlocking the adjustable connector 102 from the webbing 172 and again allowing the rotatable lock bar 160 to rotate, and thereby, again allowing movement and adjustment of the location of the adjustable connector 102 along a length of the webbing 172. Thus, in order unlock the webbing 172 from the adjustable connector 102, and vice versa, the adjustable connector 102 may be grasped and pulled upwardly until the webbing is generally perpendicularly arranged relative to the baseplate 110. Such grasping of the adjustable connector 102 can be achieved, e.g., by a user placing one or more of their fingertips under the back end 116 of the baseplate 110.

The front edge of the webbing aperture of a conventional adjustable connector spans generally straight across a baseplate between the side edges of the webbing aperture, such that substantially the entire front and back edges of the webbing aperture are parallel to one another. By contrast, in the embodiment shown in FIGS. 1-4, and best seen in FIGS. 1 and 2, the front edge 132 of the webbing aperture 130 within the baseplate 110 is arced. More specifically, in the embodiment shown in FIGS. 1-4 the front edge 132 of the webbing aperture 130 is arced as it extends between the side edges 139, 140 of the webbing aperture 130 such that a distance (d1 in FIG. 1) between a center of the arced front edge 132 and the back edge 136 of the webbing aperture 130 is greater than a distance (d2 in FIG. 1) between each of the ends 137, 138 of the arced front edge 132 and the back edge 136 of the webbing aperture 130. Preferably, the distance (d1 in FIG. 1) between the center of the arced front edge 132 and the back edge 136 of the webbing aperture 130 is at least 50% greater than the distance (d2 in FIG. 1) between each of the ends 137, 138 of the arced front edge 132 and the back edge 136 of the webbing aperture 130.

Referring to FIG. 1, in the embodiment shown, the arced front edge 132 of the webbing aperture 130 includes an intermediate arced portion 133 and distal arced portions 134, 135, wherein the intermediate arced portion 133 extends between the distal arced portion 134 and the distal arced portion 135. The intermediate arced portion 133 has an arc radius (r1 in FIG. 1) that is greater than the arc radius (r2 in FIG. 1) of each of the distal arced portions 134, 134 of the arced front edge 132 of the webbing aperture 130. In certain embodiments, the arc radius r1 of the intermediate arced portion 133 is at least three times greater (i.e., at least 3×) than the arc radius r2 of each of the distal arced portions 134, 135. For example, in a specific embodiment, the arc radius r1 of the intermediate arced portion 133 is about 60 mm (i.e., about 2.4 inches), and the arc radius r2 of each of the distal arced portions 134, 135 is about 13 mm (i.e., about 0.5 inches). The term "about", as used herein, means within plus or minus 10 percent (i.e., +/−10%) of a specified value.

The rotatable lock bar 160 (which includes the central portion 162 and the tabs 166, 168 extending from opposing longitudinal ends of the central portion 162) significantly improves the adjustability of the adjustable connector 102, compared to if the adjustable connector 102 included a conventional non-rotatable lock bar, while still enabling the adjustable connector 102 to pass applicable federal and industry safety standards, such as Standard No. 209 of the Federal Motor Vehicle Safety Standards (FMVSS) covering seatbelt assemblies, and the J3027 Recommended Practices related to "Ambulance Litter Integrity, Retention and Patient Restraint" by the Society of Automotive Engineers (SAE). Further, the arced front edge 132 of the webbing aperture 130 also significantly improves the adjustability of the adjustable connector 102, compared to if the front edge of the webbing aperture conventionally spanned generally straight across the baseplate between the side edges of the webbing aperture, while still enabling the adjustable connector 102 to pass applicable federal and industry safety standards, such as Standard No. 209 of the FMVSS, and SAE Recommendation J3027, which were mentioned above.

As noted above, in a conventional adjustable connector, the lock bar is non-rotatable, and the front edge of the webbing aperture spans generally straight across the baseplate between the side edges of the webbing aperture. Tests have shown that by including both the rotatable lock bar 160 and the arced front edge 132 of the webbing aperture 130, the adjustability of the adjustable connector 102 along a length of urethane coated webbing 172 is increased by about 60% compared to such a conventional adjustable connector, while still satisfying applicable safety standards. Such tests were performed by measuring how much force is required to move the adjustable connector relative to the urethane coated webbing 172 when a portion of the webbing was not forced against the back edge 136 of the webbing aperture (in multiple orientations ranging from horizontal to vertical). By using the rotatable lock bar 160 together with a baseplate having a webbing aperture including a conventional front edge (that spans generally straight across the baseplate between the side edges of the webbing aperture), the adjustability is still improved by about 20% compared to use of the convention non-rotatable rectangular lock bar with urethane coated webbing, while still satisfying applicable safety standards. By using a baseplate including the arced front edge 132 of the webbing aperture 130 together with a convention non-rotatable rectangular lock bar with urethane coated webbing, the adjustability is still improved by about 40% compared to if the webbing aperture had a conventional front edge (that spans generally straight across the baseplate between the side edges of the webbing aperture), while still satisfying applicable safety standards. Thus, while adjustability relative to a urethane coated webbing can be maximized by manufacturing an adjustable connector (e.g., 102, 102') that includes both of the aforementioned improvements (i.e., both a rotatable cylindrical locking bar, e.g., 160, and an arced front edge, e.g., 132, of a webbing aperture in a baseplate), improvements in adjustability relative to a urethane coated webbing can also be achieved by providing just one of these two features, and certain embodiments of the present technology are also related to adjustable connectors that include just one of the two improvements.

Figure 5:
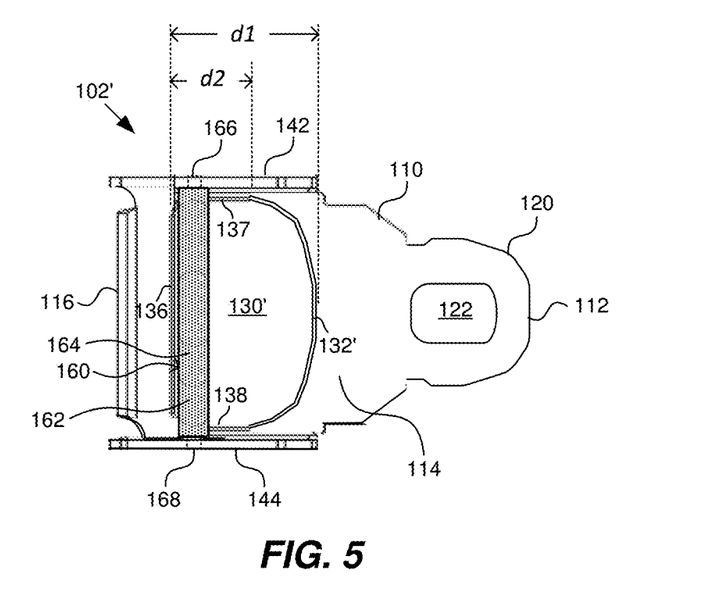
FIG. 5 is a top view of an adjustable connector according to an alternative embodiment of the present technology.

In the embodiment of the adjustable connector 102 shown in FIGS. 1-4, the arced front edge 132 of the webbing aperture 130 is shown as being continuously curved such that it is devoid of any linear segments. In an alternative embodiment of the adjustable connector, labeled 102' in FIG. 5, an arced front edge 132' of a webbing aperture 130' is shown as being a piecewise linear curve including a plurality of linear segments that collectively form the arced front edge 132' similar to the continuously curved arced front edge 132 best shown in FIG. 1. The remaining components of the adjustable connector 102', which are the same as in the adjustable connector 102, are labeled the same and need not be described again. Less than 5% of the arced front edge 132 of the webbing aperture 130, best shown in FIG. 1, is parallel to the back edge 136 of the webbing aperture 130. Less than 20% of the arced front edge 132 of the webbing aperture 130', shown in FIG. 5, is parallel to the back edge 136 of the webbing aperture 130'. Substantially the same improvements to adjustability should be achieved using this alternative embodiment.

Another benefit of having the front edge (e.g., 132 or 132') of the webbing aperture (e.g., 130 or 130') of a baseplate (e.g., 110) be arced, rather than span straight across between sides of the webbing aperture, is that is reduces the friction between the front edge and the webbing, thereby improving the reliability of the combination of the adjustable connector (e.g., 102 and 102') and the webbing 172, especially where the webbing 172 is a urethane coated webbing, or some other type of coated webbing. More specifically, where the front edge of the webbing aperture spans straight across between sides of the webbing aperture, the webbing constantly rubs against the front edge of the webbing aperture in a manner that can eventually rub off the coating and abrade the underlying webbing material such that it may eventually fail. By having the front edge of the webbing aperture be arced, rubbing of the webbing against the front edge of the webbing aperture is significantly reduced such that the coating does not rub off and the underlying webbing material does not abrade such that it may eventually fail.

An alternative embodiment of the adjustable connector, labeled 102", is shown in and described with reference to FIGS. 6-8. Elements of the adjustable connector 102" that are the same those elements of the adjustable connector 102 described above (with reference to FIGS. 1-4) are labeled the same, and need not be described again. Differences between the adjustable connector 102" and the adjustable connector 102 relates to the slots in the walls that extend perpendicularly upward from the baseplate 110, and the shape of the tabs of the rotatable lock bar that spans the gap between the walls 142, 144.

Figure 6:
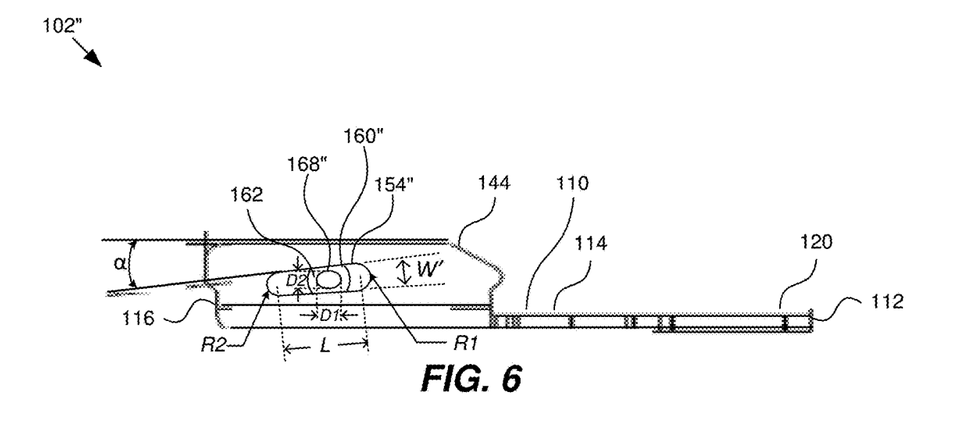
FIG. 6 is a perspective view of the adjustable connector according to another embodiment of the present technology.

Referring to FIG. 6, a slot 154" in the wall 144 is shown as being tapered such that the slot 154" is narrower its back end (closest to the back end 116 of the baseplate 110) than at its front end (closest to the front edge 132 of the webbing aperture 130). While not specifically shown in FIG. 6, a corresponding slot 152" in the other wall 142 is similarly tapered such that the slot 152" is narrower its back end (closest to the back end 116 of the baseplate 110) than at its front end (closest to the front edge 132 of the webbing aperture 130). To provide for the taper, the radius R2 of the back end of the slots 152", 154" is smaller than the radius R1 of the front ends of the slots 152", 154". In a specific embodiment, the radius R2 of the back end of the slots 152", 154" is at least 10% smaller than the radius R1 of the front ends of the slots 152", 154". For an example, the radius R2 is 1.75 mm and the radius R1 is 2.0 mm. Where the lengths L of the two tapered slots 152", 154" are the same, such lengths can also be referred to singularly as a length (or the length) of the slots.

Still referring to FIG. 6, a tab 168" is shown as extending from a longitudinal end of a rotatable lock bar 160", wherein the tab 168" is oval, rather than circular, as was the case in the previous embodiments described above. While not specifically shown in FIG. 6, a corresponding oval tab 166" extends from the other longitudinal end of the rotatable lock bar 160". To provide for their oval shape, a first diameter D1 of the tab 168" (and the tab 166") in a first radial direction is greater than a second diameter D2 of the tab 168" (and the tab 166") in a second radial direction that is orthogonal to the first radial direction. In a specific embodiment, the diameter D1 of the tab 168" (and the tab 166") in the first radial direction is at least 10% greater than the diameter D2 of the tab 168" (and the tab 166") in the second radial direction that is orthogonal to the first radial direction. For an example, the diameter D1 of the tab 168" (and the tab 166") in the first radial direction is 3.6 mm and the diameter D2 of the tab 168" (and the tab 166") in the second radial direction that is orthogonal to the first radial direction is 3.0 mm. The diameter D1 can also be referred to as the major-axis, and the diameter D2 can also be referred to as the minor-axis. In FIG. 6 the oval tab 168" is shown as being elliptical, which means it is symmetrical along both its major and minor-axis. This would also be the case for the other oval tab 166", which is a mirror image of the oval tab 168". However, the oval tabs 166", 168" need not be elliptical. Rather, the oval tabs can instead have an ovoidal (aka "egg shaped") circumference or perimeter such that they are only symmetrical along their major-axis.

As was the case with the rotatable lock bar 160 described above, the rotatable lock bar 160" also includes a central portion 162 having an outer surface 164 that is preferably textured (e.g., knurled) to increase the coefficient of friction of the outer surface 164 compared to if it were smooth, so that the outer surface 164 will readily grip a length of webbing. The oval tabs 166", 168" extend from opposing longitudinal ends of the central portion 162 of the rotatable lock bar 160" and have smaller diameters (or more generally, cross-sectional widths) than the central portion 162. While the smaller diameter D2 of the oval tab 166", 168" is slightly smaller than the narrowest width of the slots 152", 154" (i.e., is slightly smaller than twice the radius R1), the larger diameter D1 of the oval tabs 166", 168" is slightly larger than the narrowest width of the slots 152", 154" (i.e., is slightly larger than twice the radius R2). For an example, the radius R2 is 1.75 mm, the radius R1 is 2.0 mm, the diameter D1 is 3.6 mm, and the diameter D2 is 3.0 mm. Where the radius R2 of the slots 152", 154" is 1.75 mm, the width or diameter of the slots 152", 154" is 3.5 mm (i.e., twice the radius R2). Where the radius R1 of the slots 152", 154" is 2.0 mm, the width or diameter of the slots 152", 154" is 4.0 mm (i.e., twice the radius R1). Thus, it can be appreciated that if the larger diameter D1 of the oval tabs 166", 168" is 3.6 mm, that is slightly larger than the 3.5 mm narrowest width of the slots 152", 154" proximate the back ends of the sots 152", 154".

The combination of the tapered slots 152", 154" and the oval tabs 166", 168", having the relative dimension described above, enables the tabs 166", 168" to rest within, be slidable along an entire length of the tapered slots 152", 154", and be rotatable within a majority of (and preferably at least 80%) of the lengths of the slots 152", 154". However, when the oval tabs 166", 168" approach the back end of the slots 152", 154 (closest to the back end 116 of the baseplate 110) the tabs 166", 168" will eventually stop rotating because the diameter D1 (e.g., 3.6 mm, aka the major-axis) of the tabs 166", 168" is larger than the width of the tapered slots 152", 154" (e.g., 3.5 mm, which is twice 1.75 mm radius R2) at their back ends (closest to the back end 116 of the baseplate 110). Such an arrangement enables a person to relatively easily move the adjustable connector 102" along a length of the urethane coated webbing, while ensuring that under heavy loads (e.g., due to an emergency vehicle, or the like, stopping short) the adjustable connector 102" will lock in place thereby securely holding in place whomever or whatever the adjustable connector 102" and urethane coated webbing (or some other type of coated or non-coated webbing) are being used to secure. More specifically, the rotatable lock bar 160" will rotate for adjustments, but under heavy loads the small minor-axis of the cross-section of the tabs 166", 168" will rotate into the smaller radius at back ends of the tapered slots 152", 154" and be unable to rotate in a high load locking position as the larger major-axis of the cross-sections of the tabs 166", 168" is slightly bigger than the diameter of the tapered slots 152", 154" at the back ends of the tapered slots 152", 154". Thus, any attempt to rotate at the back ends of the tapered slots 152", 154" will make the bar 160 lock into the tapered slots 152", 154" and not rotate.

Figure 7:
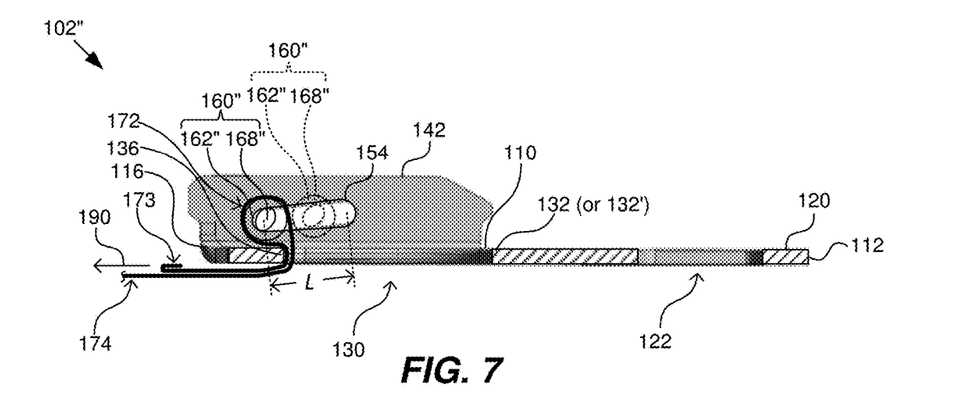
FIG. 7 is a cross-sectional view of the adjustable connector shown in FIG. 6, and showing a loop of webbing extending around a rotatable lock bar of the adjustable connector.

FIG. 7 is a cross-sectional view of the adjustable connector 102" (similar to the cross-sectional view in FIG. 4) and showing a loop of webbing 172 extending around the rotatable lock bar 160" of the adjustable connector 102". As was also the case in FIG. 4, the loop of webbing 172 includes an upper free end segment 173 and a lower connected end segment 174 that is connected to something sturdy, such as a frame of a stretcher, cot, wheelchair, seat, or vehicle, but not limited thereto. A portion of the free end segment 173 of the loop of webbing 172 comes into contact with the back edge 136 of the webbing aperture 130 when a force is applied to the free end segment 173 in the direction of the arrow 190 shown in FIG. 7. Exemplary details of the webbing 172 were discussed above with reference to FIG. 4, and thus, need not be repeated.

In the embodiment shown in FIGS. 6 and 7, the central portion 162" of the rotatable lock bar 160" is cylindrical and has a circular cross-section. The tabs 166", 168" of the rotatable lock bar 160", instead of having a circular cross-section (as was the case in FIG. 4), have an oval cross-section, as was explained above with reference to FIG. 6. In alternative embodiments, the central portion 162" of the rotatable lock bar 160" can have a square, rectangular, pentagonal, hexagonal, or octagonal cross-section, but not limited thereto. Further, the circumference or periphery of the cross-section of the oval tabs 166", 168" of the rotatable lock bar 160" need not be made up of a continuous curve so long as the tabs 166", 168" are slidable along the entire length of the tapered slots 152", 154" and rotatable in both clockwise and counter-clockwise directions within a majority of (and preferably at least 80%) of the length of the tapered slots 152", 154", and are prevented from rotating when in close proximity to the back end of the tapered slots 152", 154". This can be achieved so long as a major-axis of the cross-section of the tabs is larger than a minor-axis of the cross section of the tabs, and the major-axis of the cross-section of the tabs is slightly larger than the narrowest width of the tapered slots 152", 154" at the back ends thereof. Example alternative cross sections for the tabs are shown in FIGS. 8A, 8B, and 8C, which can be collectively referred to as FIG. 8. In FIG. 8, the major-axis of the cross-sections are labeled D1 and the minor-axis of the cross-sections are labeled D2, wherein D2 is greater than D1, and D2 is preferably at least 10% greater than D1.

Figure 8A:
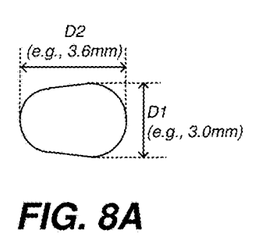
FIGS. 8A, 8B, and 8C, which can be collectively referred to as FIG. 8, show alternative cross-sections of tabs that extend from longitudinal ends of the rotatable lock bar of the adjustable connector, according to certain embodiments of the present technology.
Figure 8B:
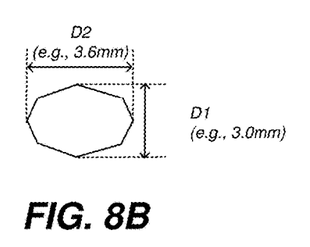
Figure 8C:
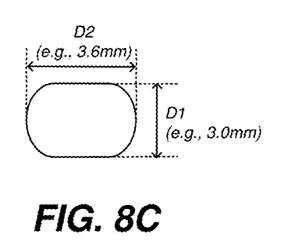

The operation of the adjustable connector 102" and how it is connected to the webbing 172 can be appreciated from the above discussion of FIG. 4, since the adjustable connector 102" operates in a similar manner as the adjustable connector 102 (shown in FIG. 4), except that the adjustable connector 102" can be locked in place in a more secure manner and withstand greater forces, due to the inclusion of the tapered slots 152", 154" and the oval tabs 166", 168" (or alternatively shaped tabs that have a cross-section with a major-axis that is greater than the minor-axis, e.g., as shown in FIG. 8). While a top view of the adjustable connector 102" is not shown, it is noted that the front edge of its webbing aperture 130 can be like the front edge 132 shown in FIG. 1, or like the front edge 132' shown in FIG. 5, depending upon the specific implementation.

While the adjustable connectors (e.g., 102, 102', 102") of the embodiments of the present technology described herein were specifically designed for use with urethane coated webbing, to significantly improve adjustability while also satisfying applicable safety standards, such embodiments of the present technology can also be used with other types of coated webbing, as well as with conventional non-coating webbing. In other words, the adjustable connectors (e.g., 102 and 102') according to embodiments of the present technology described herein, can also be attached to conventional non-coated webbing.

While not specifically shown in the FIGS., the adjustable connectors (e.g., 102, 102', 102") of the embodiments of the present technology can also include a plastic cover that snaps over a baseplate (e.g., 110) such that the lock bar (e.g., 160) and the webbing aperture (e.g., 130, 130') cannot be seen when viewing the adjustable connectors from the top.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An adjustable connector adapted to connect webbing to a buckle, the adjustable connector comprising:
   a baseplate that is generally planar and includes a front end, a back end, and a central portion between the front and back ends;
   a tongue at the front end of the baseplate and adapted to be received and locked in a buckle;
   a webbing aperture within the central portion of the baseplate, the webbing aperture including a front edge, a back edge, and first and second side edges;
   first and second walls extending perpendicularly from the baseplate;
   first and second slots respectively within the first and second walls; and
   a rotatable lock bar including a central portion having an outer surface and first and second tabs extending from opposing longitudinal ends of the central portion;
   wherein the first and second tabs rest respectively within the first and second slots, and are slidable along a length of the first and second slots and rotatable within at least a majority of the length of the first and second slots, to thereby enable the rotatable lock bar to be slidable along the length of the first and second slots and completely rotatable in both clockwise and counterclockwise directions within at least the majority of the length of the first and second slots.

2. The adjustable connector of claim 1, wherein the adjustable connector is adapted for use with a coated webbing having a length thereof that is received within the webbing aperture and loops around at least 180 degrees of the outer surface of the rotatable lock bar, and wherein:
   the rotatable lock bar is adapted to lock the adjustable connector in place relative to the coated webbing, in response to a force being applied to the webbing in a direction that is generally opposite the tongue and generally parallel to the baseplate such that a portion of the webbing adjacent to the back edge of the webbing aperture is forced against the back edge of the webbing aperture; and
   the rotatable lock bar is adapted to rotate and allow the adjustable connector to be moved relative to the coated webbing, in response to a force being applied to the webbing in a direction that is generally perpendicular to the baseplate such that the portion of the webbing adjacent to the back edge of the webbing aperture is not forced against the back edge of the webbing aperture.

3. The adjustable connector of claim 1, wherein:
the front edge of the webbing aperture comprises an arced front edge that extends between the first and second side edges of the webbing aperture such that a distance between a center of the arced front edge of the webbing aperture and the back edge of the webbing aperture is greater than a respective distance between each of the ends of the arced front edge and the back edge of the webbing aperture.

4. The adjustable connector of claim 3, wherein:
the adjustable connector is adapted for use with a coated webbing having a length thereof that is received within the webbing aperture and loops around at least 180 degrees of the outer surface of the rotatable lock bar; and
the arced front edge of the webbing aperture provides for increased adjustability of the adjustable connector relative to the coated webbing, in response to a force being applied to the webbing in a direction that is generally perpendicular to the baseplate such that the portion of the webbing adjacent to the back edge of the webbing aperture is not forced against the back edge of the webbing aperture, compared to if the front edge of the webbing aperture was a straight edge extending perpendicularly between the first and second side edges of the webbing aperture.

5. The adjustable connector of claim 3, wherein the arced front edge of the webbing aperture is devoid of any linear segments.

6. The adjustable connector of claim 3, wherein the arced front edge of the webbing aperture comprises a piecewise linear curve including at least one linear segment.

7. The adjustable connector of claim 1, wherein:
each of the first and second slots comprises a tapered slot having front end and a back end, with a width of the front end of the tapered slot being greater than a width of the back end of the tapered slot.

8. The adjustable connector of claim 7, wherein:
each of the first and second tabs has a cross-section including a major-axis that is larger than a minor-axis that is orthogonal to the major-axis;
the major-axis of the cross-section of each of the first and second tabs is smaller than the width of each of the first and second slots at the front ends of the first and second slots; and
the major-axis of the cross-section of each of the first and second tabs is larger than the width of each of the first and second slots at the back ends of the first and second slots.

9. The adjustable connector of claim 8, wherein:
the rotatable lock bar is slidable along and fully rotatable within the first and second tapered slots from the front ends of the first and second tapered slots to at least halfway toward the back ends of the first and second tapered slots; and
the rotatable lock bar is no longer fully rotatable within the first and second tapered slots when the first and second tabs of the rotatable lock bar are proximate the back ends of the first and second tapered slots, due to the major-axis of each of the first and second tabs being larger than the width of each of the first and second slots at the back ends of the first and second slots.

10. The adjustable connector of claim 8, wherein:
the cross-section of each of the first and second tabs is oval.

11. An adjustable connector adapted to connect webbing to a buckle, the adjustable connector comprising:

a baseplate that is generally planar and includes a front end, a back end, and a central portion between the front and back ends;
a tongue at the front end of the baseplate and adapted to be received and locked in a buckle;
a webbing aperture within the central portion of the baseplate, the webbing aperture including a front edge, a back edge, and first and second side edges;
first and second walls extending perpendicularly from the baseplate;
first and second tapered slots respectively within the first and second walls; and
a rotatable lock bar extending between and slidable along a length the first and second tapered slots;
the rotatable lock bar including a central portion having an outer surface and first and second tabs extending from opposing longitudinal ends of the central portion;
each of the first and second tabs having an oval cross-section that enables the rotatable lock bar to be completely rotatable in both clockwise and counterclockwise directions within at least a majority of the length of the first and second slots.

12. The adjustable connector of claim 11, wherein the adjustable connector is adapted for use with a coated webbing having a length thereof that is received within the webbing aperture and loops around at least a portion of an outer surface of the lock bar, and wherein:
the lock bar is adapted to lock the adjustable connector in place relative to the coated webbing, in response to a force being applied to the webbing in a direction that is generally opposite the tongue and generally parallel to the baseplate such that a portion of the webbing adjacent to the back edge of the webbing aperture is forced against the back edge of the webbing aperture; and
the lock bar is adapted to be moved relative to the coated webbing, in response to a force being applied to the webbing in a direction that is generally perpendicular to the baseplate such that the portion of the webbing adjacent to the back edge of the webbing aperture is not forced against the back edge of the webbing aperture.

13. The adjustable connector of claim 11, wherein:
the oval cross-section of each of the first and second tabs includes a major-axis and a minor-axis that is orthogonal to and smaller than the major-axis;
each of the first and second tapered slots has a front end and a back end, the front end of each of the first and second tapered slots closer to the front end of the baseplate than to the back end of the baseplate, and the back end of each of the first and second tapered slots closer to the back end of the baseplate than to the front end of the baseplate;
a width of each of the first and second tapered slots is larger at the front end thereof than at the back end thereof; and
the major-axis of the oval cross-section of each of the first and second tabs is larger than the width of each of the first and second tapered slots at the back ends thereof.

14. The adjustable connector of claim 11, wherein:
the front edge of the webbing aperture comprises an arced front edge that extends between the first and second side edges of the webbing aperture such that a distance between a center of the arced front edge of the webbing aperture and the back edge of the webbing aperture is greater than a respective distance between each of the ends of the arced front edge and the back edge of the webbing aperture.

15. The adjustable connector of claim 14, wherein:
the distance between the center of the arced front edge of the webbing aperture and the back edge of the webbing aperture is at least 50% greater than the respective distance between each of the ends of the arced front edge and the back edge of the webbing aperture.

16. The adjustable connector of claim 14, wherein:
the arced front edge of the webbing aperture includes an intermediate arced portion that extends between first and second distal arced portions; and
the intermediate arced portion of the arced front edge of the webbing aperture has an arc radius that is greater than a respective arc radius of each of the first and second distal arced portions of the arced front edge of the webbing aperture.

17. The adjustable connector of claim 16, wherein:
the arc radius of the intermediate arced portion of the arced front edge of the webbing aperture is at least three times greater than the respective arc radius of each of the first and second distal arced portions of the arced front edge of the webbing aperture.

18. An adjustable connector adapted to connect webbing to a buckle, the adjustable connector comprising:
a baseplate that is generally planar and includes a front end, a back end, and a central portion between the front and back ends;
a tongue at the front end of the baseplate and adapted to be received and locked in a buckle;
a webbing aperture within the central portion of the baseplate, the webbing aperture including a front edge, a back edge, and first and second side edges;
first and second walls extending perpendicularly from the baseplate;
first and second tapered slots respectively within the first and second walls, the first and second slots each sloping downwards towards the back end of the baseplate; and
a rotatable lock bar including a central cylindrical portion having a textured outer surface and first and second tabs having oval cross-sections and extending from opposing longitudinal ends of the central cylindrical portion;
wherein the first and second tabs rest within, are slidable along, and are rotatable within, the first and second tapered slots to thereby enable the rotatable lock bar to be slidable along a length of the tapered slots, and completely rotatable in both clockwise and counter-clockwise directions within at least a majority of the length of the tapered slots; and
wherein the front edge of the webbing aperture comprises an arced front edge that extends between the first and second side edges of the webbing aperture such that a distance between a center of the arced front edge of the webbing aperture and the back edge of the webbing aperture is at least 50% greater than a respective distance between each of the ends of the arced front edge and the back edge of the webbing aperture.

19. The adjustable connector of claim 18, wherein:
the arced front edge of the webbing aperture is devoid of any linear segments;
the arced front edge of the webbing aperture includes an intermediate arced portion that extends between first and second distal arced portions; and
the intermediate arced portion of the arced front edge of the webbing aperture has an arc radius that is at least three times greater than a respective arc radius of each of the first and second distal arced portions of the arced front edge of the webbing aperture.

20. The adjustable connector of claim 18, wherein the arced front edge of the webbing aperture comprises a piecewise linear curve including at least one linear segment.

* * * * *